US008645886B2

(12) United States Patent
Abhishek et al.

(10) Patent No.: US 8,645,886 B2
(45) Date of Patent: Feb. 4, 2014

(54) INTEGRATED CIRCUIT POWER MANAGEMENT VERIFICATION METHOD

(75) Inventors: Kumar Abhishek, Ghaziabad (IN);
Benjamin J. Ehlers, Austin, TX (US);
Sunny Gupta, Noida (IN); Stefano Pietri, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/447,305

(22) Filed: Apr. 16, 2012

(65) Prior Publication Data
US 2013/0275936 A1 Oct. 17, 2013

(51) Int. Cl.
*G06F 17/50* (2006.01)
*G06F 17/10* (2006.01)

(52) U.S. Cl.
USPC ........... 716/109; 716/106; 716/120; 716/127; 716/132; 716/138; 703/2; 703/14; 703/18

(58) Field of Classification Search
USPC .......... 716/106, 109, 120, 127, 132, 136, 138
See application file for complete search history.

(56) References Cited

U.S. PATENT DOCUMENTS

| | | | |
|---|---|---|---|
| 6,105,139 A | 8/2000 | Raghunathan | |
| 6,785,873 B1 * | 8/2004 | Tseng | 716/102 |
| 6,937,971 B1 * | 8/2005 | Smith et al. | 703/18 |
| 7,013,254 B2 * | 3/2006 | Gauthier et al. | 703/18 |
| 7,080,341 B2 | 7/2006 | Eisenstadt | |
| 7,085,943 B2 * | 8/2006 | Chun et al. | 713/300 |
| 7,143,022 B1 * | 11/2006 | Wang et al. | 703/14 |
| 7,251,794 B2 | 7/2007 | Blanco | |
| 7,359,843 B1 * | 4/2008 | Keller et al. | 703/2 |
| 7,439,718 B2 * | 10/2008 | Rozen et al. | 323/274 |
| 7,511,528 B2 * | 3/2009 | Arsovski et al. | 326/27 |
| 7,586,299 B2 * | 9/2009 | Fujiyama et al. | 323/350 |
| 7,634,668 B2 * | 12/2009 | White et al. | 713/300 |
| 7,705,626 B2 * | 4/2010 | Arsovski et al. | 326/27 |
| 7,723,968 B2 * | 5/2010 | Okuyama et al. | 323/274 |
| 7,770,142 B1 | 8/2010 | Shmayovitsh | |
| 7,802,220 B1 * | 9/2010 | Popovich et al. | 716/120 |
| 7,930,652 B2 * | 4/2011 | Wood | 716/113 |
| 7,979,239 B2 * | 7/2011 | Trias | 702/182 |
| 7,999,601 B2 * | 8/2011 | Schlueter et al. | 327/383 |

(Continued)

OTHER PUBLICATIONS

Padiyar et al.; Itage regulator module design considerations to enhance efficiency:; Publication Year: 2010; Industrial and Information Systems (ICIIS), 2010 International Conference on; pp. 388-392.*

(Continued)

*Primary Examiner* — Helen Rossoshek
(74) *Attorney, Agent, or Firm* — Charles Bergere

(57) ABSTRACT

A method for verifying power management of an integrated circuit design includes estimating a current load requirement of clocked modules in the circuit design based on the clock frequency and a predefined current load model. The voltage supplied to the circuit design is monitored. A first voltage regulator provides additional current drive to the circuit design when the supplied voltage drops below a threshold value of a full throttle run mode of the circuit design. A second voltage regulator is enabled to boost a response time of the first voltage regulator when the voltage drops below the threshold value.

18 Claims, 5 Drawing Sheets

(56) References Cited

U.S. PATENT DOCUMENTS

| | | | |
|---|---|---|---|
| 8,060,349 B2* | 11/2011 | Chu et al. | 703/2 |
| 8,286,110 B1* | 10/2012 | Kukal et al. | 716/109 |
| 8,344,713 B2* | 1/2013 | Shrivas et al. | 323/273 |
| 2002/0053066 A1* | 5/2002 | Richter et al. | 716/5 |
| 2008/0301478 A1* | 12/2008 | Scott et al. | 713/320 |
| 2010/0060083 A1* | 3/2010 | Rolland | 307/80 |
| 2010/0283445 A1* | 11/2010 | Ramaraju et al. | 323/299 |
| 2011/0133709 A1* | 6/2011 | Mengad | 323/271 |
| 2011/0257956 A1* | 10/2011 | Goel et al. | 703/18 |

OTHER PUBLICATIONS

Li et al.; "Enhancing power distribution system through 3D integrated models, optimized designs, and switching VRM model"; Publication Year: 2000; Electronic Components & Technology Conference, 2000. 2000 Proceedings. 50th; pp. 272-277.*

Juliama Gjanci, Masud H. Chowdhury, A Hybrid Scheme for On-Chip Voltage Regulation in System-On-a-Chip (SOC), IEEE Transactions on Very Large Scale Integration (VLSI) Systems, Oct. 14, 2010, vol. 19, No. 11.

* cited by examiner

INTEGRATED CIRCUIT POWER MANAGEMENT VERIFICATION METHOD

BACKGROUND OF THE INVENTION

The present invention generally relates to integrated circuit (IC) design, and more particularly, to verification of power management in an IC design.

Electronic circuits, such as microprocessors, microcontroller units (MCUs), system-on-chips (SoCs), and application specific integrated circuits (ASICs) are widely used in applications including industrial applications, automobiles, home appliances, and mobile and handheld devices. As an important safety critical example, SoCs are used to monitor and control critical functions in an automobile, such as opening of airbags. Power failure in SoCs can be fatal to the operation of the automobile and needs to be managed properly. Hence, power management plays a vital role in the operation of SoCs. An efficient power management system acts as a fail-safe mechanism against errors caused by power failures. Similarly, power management in other devices, such as mobile phones and laptop computers, is critical for the operation of these devices.

Power management systems are often integrated in SoCs by using low cost voltage regulators and board components to reduce the manufacturing cost. Low cost voltage regulator components often have poor bandwidth and hence are not reliable for high switching frequency SoCs. SoCs also may include heterogeneous cores and components that operate on mixed signals (both digital and analog). Signal noise and fluctuations caused due to changes in the activity of mixed signal components further result in additional demands on the power management systems to maintain a constant voltage in the SoCs.

Power management systems usually function satisfactorily under steady state conditions that include run and halt modes of a SoC. However, they are prone to failure in high demand situations that include load transitions and mode changes (transition of a SoC from run mode to halt mode and vice versa). The load on power management systems due to high demand situations, signal fluctuations, and constraints due to low cost components leads to power management problems. Conventional techniques identify these problems after the SoC design (including the power management system) has been transferred to a chip, thereby rendering further modifications difficult.

Therefore, there is a need for a power management system that functions efficiently with weak bandwidth voltage regulators and ensures safe operation against load transitions and mode changes of a SoC. Further, there is a need to verify power management systems, identify and rectify functional problems during the design stage of a SoC, i.e., before the power management system implemented in Silicon. Finally, there is a need for a power management system that overcomes the above-mentioned limitations of conventional power management systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements. It is to be understood that the drawings are not to scale and have been simplified for ease of understanding the invention.

DETAILED DESCRIPTION OF THE PRESENT INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for verifying power management in an electronic circuit design is provided. The verification is performed using an external design verification apparatus. The electronic circuit design includes a first voltage regulator and a plurality of modules that are clocked at a clock frequency. The method includes estimating a current load requirement of the clocked modules based on the clock frequency and a predefined current load model. The voltage supplied to the electronic circuit design is monitored. The first voltage regulator regulates the voltage supplied to the electronic circuit design around an optimal operating voltage. The first voltage regulator also regulates the voltage based on the estimated current load requirement.

Various embodiments of the present invention provide a system and method for verifying power management in an electronic circuit design. Verification ensures safe operation of the electronic circuit during transitions in load, activity, and modes of operation thereof. Conventional power management systems are verified after the design is transferred to a chip, making any change in the circuit design difficult in the event of a power failure during load transitions. The present invention saves cost and effort by enabling verification at the design stage (i.e., before the circuit design is implemented in Silicon). Verification also helps in ensuring that weak bandwidth voltage regulators and low-cost on-board components operate accurately in high demand situations such as load transitions, mode changes, signal noises and signal fluctuations in mixed signal SoCs.

Figure 1:
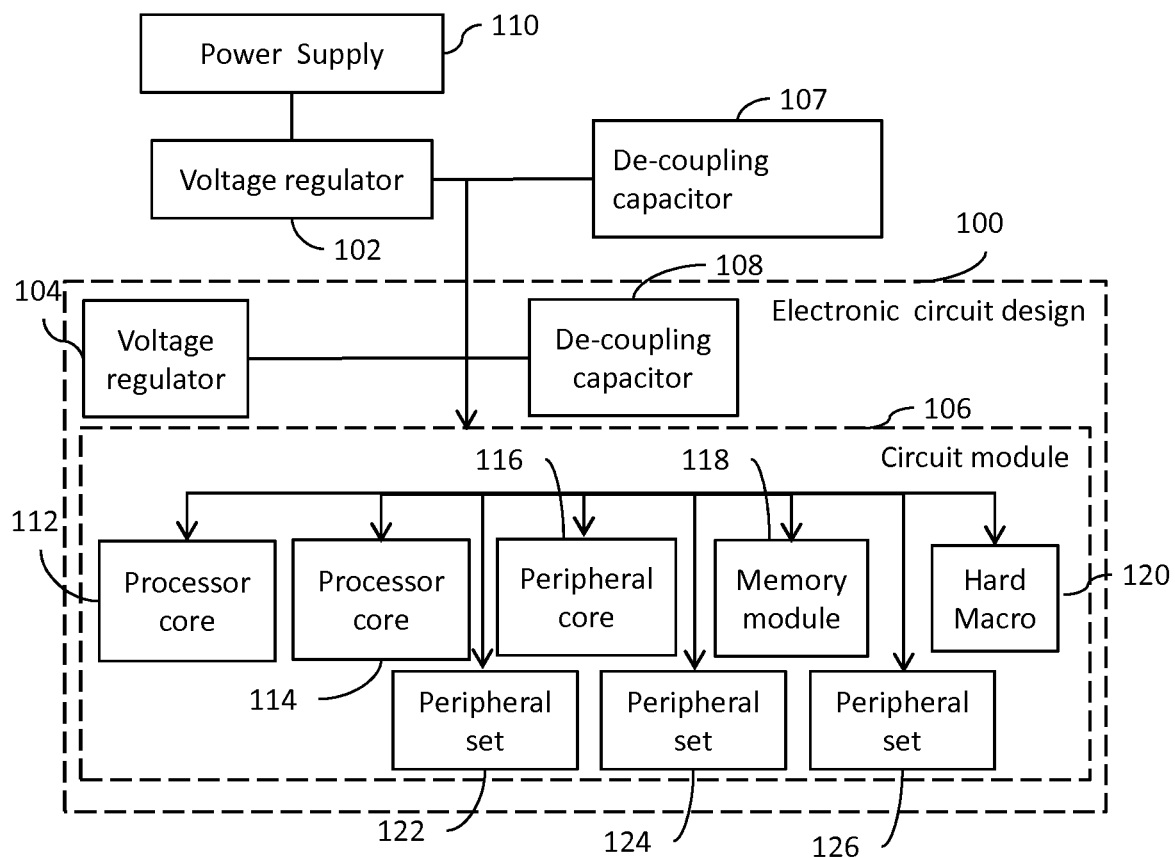
FIG. 1 is a schematic block diagram of an electronic circuit in accordance with an embodiment of the present invention.

Referring now to FIG. 1, a schematic block diagram of an electronic circuit 100 in accordance with an embodiment of the present invention is shown. The electronic circuit 100 includes first and second voltage regulators 102 and 104, a circuit module 106, first and second de-coupling capacitors 107 and 108, and a power supply 110. In various embodiments of the present invention, the electronic circuit 100 may be a system-on-chip (SoC), a microcontroller unit (MCU), an application specific integrated circuit (ASIC) or any other circuit and may be used to control critical applications. For example, the electronic circuit 100 may control the deployment mechanism of airbags in an automobile. The circuit module 106 may be a digital circuit, an analog circuit, or a combination thereof (i.e., a mixed signal circuit) that requires power management. The circuit module 106 may include multiple modules, such as processor cores 112 and 114, a peripheral core 116, a memory module 118, a hard macro 120 and peripheral sets 122-126. As is known in the art, a hard macro means a circuit that does not need to be synthesized because it's already has a defined structure and layout; for example, an SoC can have soft logic such as core, and hard macros such as Flash and SRAM memories.

The first voltage regulator 102 is a low cost and low bandwidth voltage regulator and may be integrated off-chip (outside the electronic circuit 100) and regulates voltage supplied to the circuit module 106. The second voltage regulator 104 is an on-chip voltage regulator that provides voltage to the circuit module 106 and supports the first voltage regulator 102 during high power surges.

The first and second de-coupling capacitors 107 and 108 get charged by the first and second voltage regulators 102 and 104, respectively and provide additional voltage to the first and second voltage regulators 102 and 104, during high current demands of the circuit module 106. The power supply 110 provides power to the first voltage regulator 102, which in turn provides power to the circuit module 106. The voltage requirements of the circuit module 106 depend on the activities and modes of operation of the circuit module 106. For example, the voltage requirements may depend on the load on the circuit module 106, number of active modules within the circuit module 106, clock frequency, and other operating specifications of the circuit module 106.

The power management of the electronic circuit 100 is verified using suitable electronic design automation (EDA) tools. EDA tools include mixed signal verification tools that can simulate digital and analog circuits together, such as Incisive™ Unified Simulator (IUS) by Cadence Design Systems, Inc. The first and second voltage regulators 102 and 104, and the first and second de-coupling capacitors 107 and 108 are simulated using an analog descriptive language, such as SPICE or Verilog A. The first and second voltage regulators 102 and 104, and the first and second de-coupling capacitors 107 and 108 may be modeled at the SPICE or behavioral level during the simulation. The circuit module 106 also is translated to a current load model in Verilog A. The entire simulation including digital and analog models runs on a mixed-signal simulator. Analog mixed signal (AMS) verification test patterns may be used for verifying transitions from all possible mode crossovers by dynamically generating current load models.

Figure 2A:
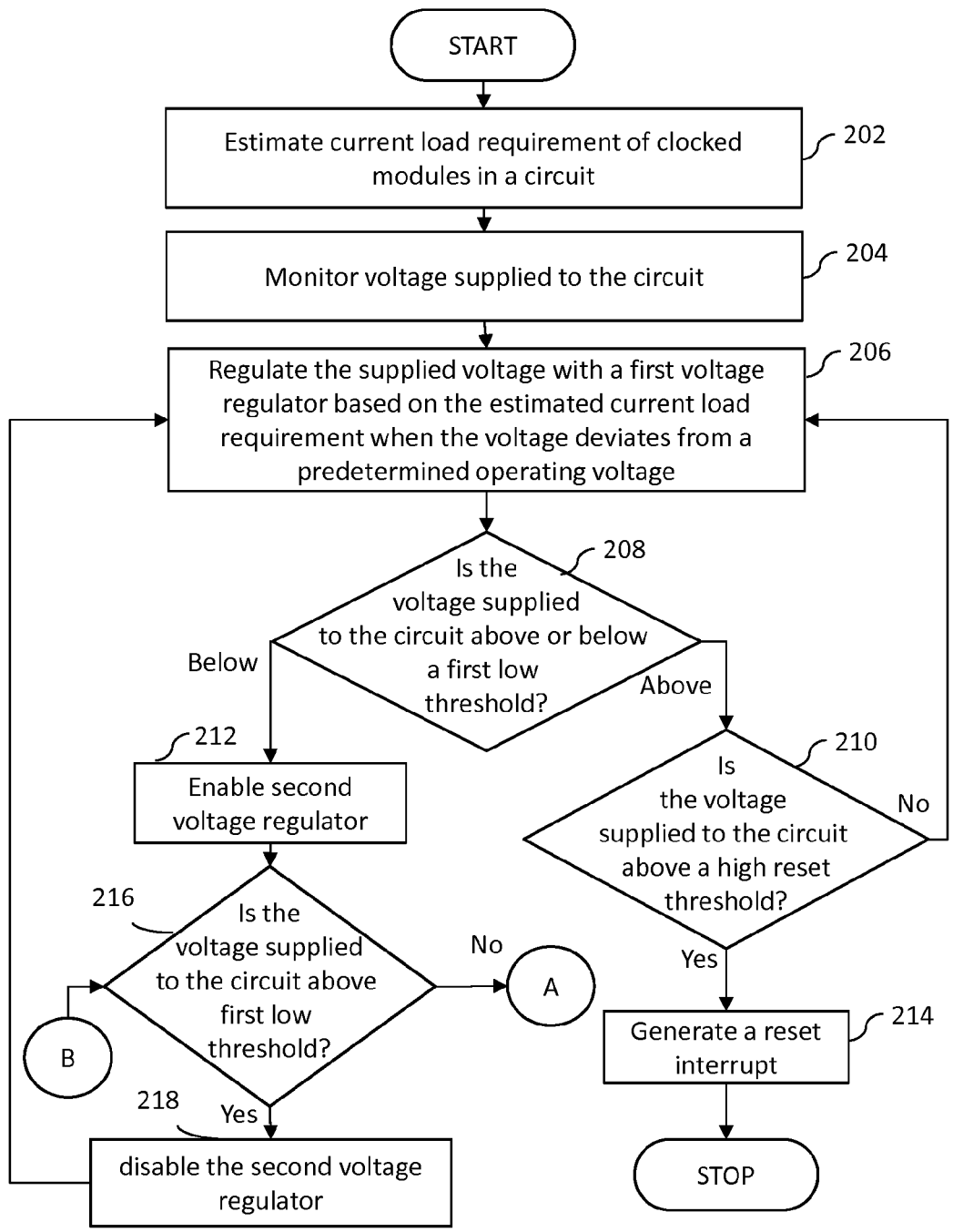
FIGS. 2A and 2B are a flow chart illustrating a method for verifying power management of the electronic circuit of FIG. 1, in accordance with an embodiment of the present invention.
Figure 2B:
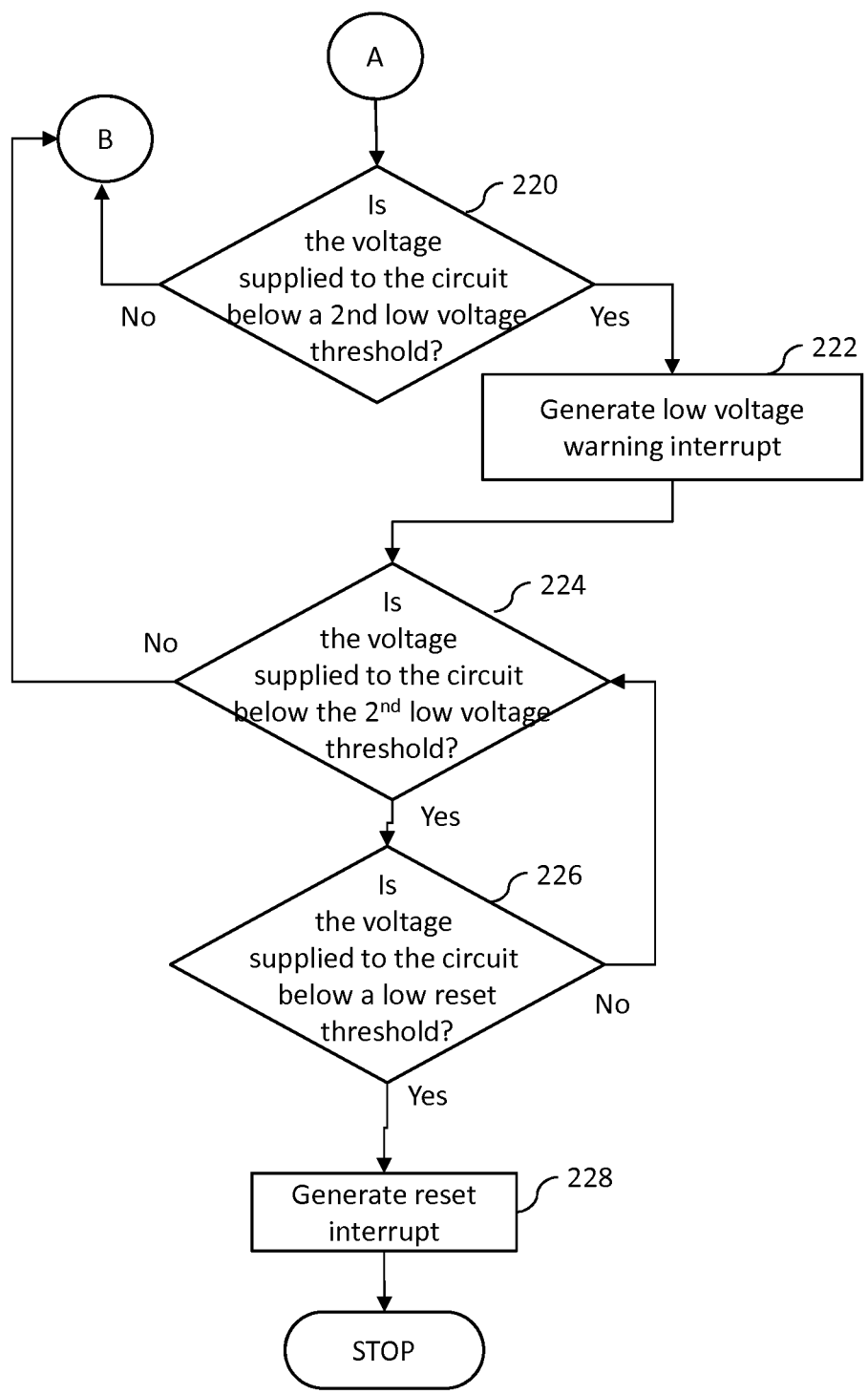

Referring now to FIGS. 2A and 2B, a flow chart illustrating a method for verifying power management of the electronic circuit 100 of FIG. 1 in accordance with an embodiment of the present invention is shown. At step 202, the current load requirement of the active modules within the circuit module 106 is estimated based on a clock frequency and a predefined current load model. The current load requirement is used by the first and second voltage regulators 102 and 104 for regulating the voltage supplied to the circuit module 106. The predefined current load model may be a Verilog-AMS model that dynamically calibrates the current load requirement of the active modules in proportion to the clock frequency, activity profile of the peripheral sets 122-126, the hard macro 120, and a gate count of the modules. The gate count corresponds to the number of logic gates of the module. The current load model estimates the current load of the circuit module 106 based on active modules only, i.e., the modules that are clocked. In an embodiment of the present invention, the current load model dynamically calibrates the current load based on the gate count and a predefined milliampere per megahertz per gate (mA/Mhz/gate) rating of each clocked module, as defined by the module specifications and the design manufacturing technology node. Theoretically, the current load of a clocked module is given by equation (1), $$I = K1 * \text{gate count} * \text{clock frequency} \qquad (1)$$

Where,
I=the current load of a clocked module;
K1=the mA/Mhz/gate rating of the clocked module; and
clock frequency=the maximum operating clock frequency of the clocked module.

In another embodiment of the present invention, the current load model dynamically calibrates the current load of the processor cores 112-114, the peripheral core 116, the memory module 118 and the peripheral sets 122-126 based on a predefined milliampere per megahertz (mA/Mhz) rating provided by the module specifications, as given by equation (2), $$I = K2 * \text{clock frequency} \qquad (2)$$

Where,
K2=the mA/Mhz rating of the clocked module.

The current load of the hard macro 120 is estimated based on datasheet specifications and analog IP SPICE simulations. Current load of each active module is then used to obtain the overall current load of the circuit module 106.

During verification, the current load model dynamically varies the current load for various configurations of the circuit module 106 that include single-core and multi-core configurations, type of peripheral sets used, and different modes of operation including low power mode entry-exit and reset. In addition, the current load is dynamically varied based on the activity in the circuit module 106, such as the frequency of operation.

At step 204, the voltage supplied to the circuit module 106 is monitored. AMS based voltage and current monitors are modeled and used to monitor the voltage and current of the circuit module 106 and to check if they adhere to the specifications.

At step 206, the first voltage regulator 102 regulates the voltage supplied to the circuit module 106 when the voltage monitors detect a deviation in the voltage supplied to the circuit module 106 from a predetermined optimal operating voltage ($V_{Opt}$). The optimal operating voltage is the voltage at which the energy consumption of the circuit module 106 is at or near the minimum during full-throttle run mode. The first voltage regulator 102 provides an additional current drive to ramp up the voltage supplied to the circuit module 106 to the level estimated by the current load model. For example, if the current load model estimates that a design operating voltage for the circuit module 106 is "$V_1$", and the voltage monitors determine that the voltage has dropped to "$V_2$" (lower than $V_{Opt}$), the first voltage regulator 102 provides an additional current drive to the circuit module 106 to ramp up the voltage supplied to the circuit module 106 to the required level, $V_1$.

At step 208, the voltage supplied to the circuit module 106 is checked to determine if it is above or below a first low threshold ($V_{1Lth}$). The method proceeds with step 210 if the voltage is above $V_{1Lth}$. If the voltage is below $V_{1Lth}$, the method proceeds with step 212. At step 210, the voltage supplied to the circuit module 106 is checked to determine if it is above a predetermined high reset threshold ($V_{HRth}$). The method proceeds with step 206 if the voltage is below $V_{HRth}$, else it step 214 if the voltage is above $V_{HRth}$. At step 214, an interrupt is generated to reset the circuit module 106. The voltage may overshoot $V_{HRth}$ when the load drops, for example, when the circuit module 106 transitions from a high power mode to a low power mode. Thus, if the circuit module 106 operates in a high power mode with a clock frequency of 500 MHz and a current of 500 mA and transitions to a low-power mode requiring a clock frequency of 60 Mhz and a current of 60 mA, the current load model estimates the current requirement and loads the first voltage regulator 102 with the estimated current load values to reduce the current of the circuit module 106 accordingly. However, the voltage in the circuit module 106 may overshoot and cause a reset till the current is pulled down. In conventional systems, the voltage level overshoots until the voltage regulator determines the change in the current load from 500 mA to 60 mA, causing a reset at the beginning of the low power mode. However, the current load model of the present invention loads the first voltage regulator 102 and ensures that the reset is caused only due to the failure of the response time of the first voltage regulator 102 and not at the beginning of the low-power mode.

At step 212, the second voltage regulator 104 is activated to provide an additional current drive to regulate the voltage supplied to the circuit module 106. The drop in the voltage below $V_{1Lth}$ after enabling the first voltage regulator 102 to provide an additional current drive may occur due to high load transitions and weak bandwidth of the first voltage regulator 102. The second voltage regulator 104 provides the current drive, in addition to the current drive provided by the first voltage regulator 102, to ramp-up the voltage of the circuit module 106. Thus, the second voltage regulator 104 boosts the response time of the first voltage regulator 102. For example, when the circuit module 106 transitions from a low power mode to a high power mode, the current load model estimates the current load and causes the first voltage regulator 102 to provide the required voltage. However, the first voltage regulator 102 requires a finite period of time to ramp up the voltage level. In such a case, the voltage may further drop to the first predetermined low threshold ($V_{1Lth}$), in which case the second voltage regulator 104 is enabled to support the first voltage regulator 102 to maintain the required voltage across the circuit module 106. $V_{1Lth}$ is determined based on the design of the circuit module 106 and the response time of the second voltage regulator 104. For example, if the response time of the second voltage regulator 104 is $t_1$, $V_{1Lth}$ is determined such that the voltage level of the circuit module 106 does not drop below a second predetermined low threshold, $V_{2Lth}$, within time $t_1$ of enabling the second voltage regulator 104. $V_{2Lth}$ is the voltage level below which the circuit module 106 operates at a reduced performance. In other words, $V_{2Lth}$ is the voltage level below which only a few selected operations are permitted that require low voltage and current levels.

At step 216, it is checked if the voltage supplied to the circuit module 106 has recovered after enabling the second voltage regulator 104 and increased above $V_{1Lth}$. If the voltage is above $V_{1Lth}$, the second voltage regulator 104 is disabled at step 218. After step 218, the method proceeds to step 206, at which the first voltage regulator 102 regulates the voltage supplied to the circuit module 106. If at step 216, it is determined that the voltage supplied has not increased above $V_{1Lth}$, the step 220 is performed. At step 220, the voltage supplied to the circuit module 106 is checked to determine if it is below $V_{2Lth}$. When the voltage supplied is not below $V_{2Lth}$, step 216 is performed, which checks if the voltage has recovered above $V_{1Lth}$. When the voltage supplied is determined to be below $V_{2Lth}$ at step 220, a low voltage warning interrupt is generated at step 222 to reduce the frequency of the clock signal and recover the voltage. Thereafter, it is checked at step 224 if the voltage supplied to the circuit module 106 is still below $V_{2Lth}$. When the voltage supplied has recovered above $V_{2Lth}$ due to the low voltage warning interrupt, step 216 is performed again. Otherwise, the method proceeds to step 226.

At step 226, the voltage supplied to the circuit module 106 is checked to determine if it is below a predetermined low reset threshold ($V_{LRth}$). When the voltage supplied is not below $V_{LRth}$, the method proceeds to step 224 to check if the voltage has recovered above $V_{2Lth}$. An interrupt is generated to reset the circuit module 106 at step 228, when the voltage supplied to the circuit module 106 drops below $V_{LRth}$.

$V_{LRth}$ is the voltage level below which the circuit module 106 does not generate functionally correct results. Such a situation arises when the first and second voltage regulators 102 and 104 are unable to maintain the required voltage levels during high load transitions. In such cases, the reset interrupt is generated to prevent the circuit module 106 from operating at a voltage level at which it may not function correctly. For example, if the circuit module 106 operates in a low power mode with a clock frequency of 60 MHz and a current of 20 mA, and transitions to a high power mode that requires a clock frequency of 500 Mhz and a current of 500 mA, the current load model estimates the current requirement and loads the first voltage regulator 102 with the estimated current load values to increase the current in the circuit module 106 to a required level. However, the voltage in the circuit module 106 may still drop until the current is increased to the required level and cause the second voltage regulator 104 to be activated. If both the first and second voltage regulators 102 and 104 are unable to provide the required voltage, the circuit module 106 is reset when the voltage drops to $V_{LRth}$. In conventional systems, the voltage continues to drop until the voltage regulator determines the change in the load from 60 mA to 500 mA, causing a reset at the beginning of the high power mode. However, the current load model of the present invention loads the first voltage regulator 102 and ensures that the reset is caused only due to the failure in response time of both the first and second voltage regulators 102 and 104, and thereby prevents reset at the beginning of the high power mode.

In an embodiment of the present invention, steps 206, 208, 210, 216, 220, 224 and 226 are executed using comparators and the voltage monitor (not shown in FIG. 2). The voltage monitor continuously monitors the voltage supplied to the circuit module 106 and provides the monitored value to the comparators. The comparators simultaneously compare the monitored value with $V_{HRth}$, $V_{Opt}$, $V_{1Lth}$, $V_{2Lth}$, and $V_{LRth}$. The steps shown in FIGS. 2A and 2B are then executed depending on the output of the comparators.

The verification process further allows optimizing the value of the first and second de-coupling capacitors 107 and 108. Fluctuations in the power supply 110 may degrade the performance of the electronic circuit 100. Circuits such as the circuit module 106 may fail to respond to voltage transitions that are less than a few nanoseconds by initiating a reset and produce corrupt data. The first and second de-coupling capacitors 107 and 108 provide an additional charge respectively to the first and second voltage regulators 102 and 104 to compensate for these voltage transitions. The capacitances of the first and second de-coupling capacitors 107 and 108 needs to be optimally selected such that the voltage of the circuit module 106 remains above $V_{1Lth}$. The circuit module 106 may still suffer timing violations with un-optimized first and second de-coupling capacitors 107 and 108 as the voltage may drop below $V_{Opt}$ and $V_{1Lth}$. The verification process of the present invention allows optimizing the capacitances of the first and second de-coupling capacitors 107 and 108 before the electronic circuit 100 is implemented in Silicon.

Figure 3:
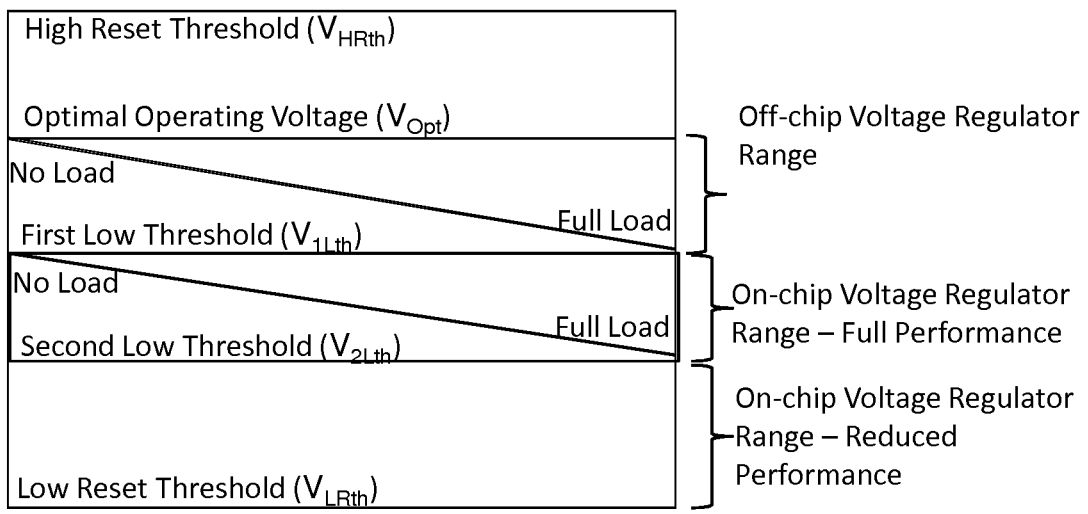
FIG. 3 is a diagram representing voltage levels for operation and reset of the electronic circuit of FIG. 1, in accordance with an embodiment of the present invention.

Referring now to FIG. 3, a voltage level diagram representing the voltage levels for operation and reset of the electronic circuit 100, in accordance with an embodiment of the present invention, is shown. The reset interrupt is generated at $V_{HRth}$ to protect the circuit module 106 from high voltage levels. The first voltage regulator 102 is enabled to provide an additional current drive below $V_{Opt}$. The second voltage regulator 104 is enabled below $V_{1Lth}$. The voltage range between $V_{Opt}$ and $V_{1Lth}$ represents the range of operation of the first voltage regulator 102, where the circuit module 106 operates at no-load ($V_{Opt}$) and at full-load ($V_{1Lth}$). The voltage range between $V_{1Lth}$ and $V_{2Lth}$ represents the range of operation of the second voltage regulator 104 along with the first voltage regulator 102, where the circuit module 106 operates at no-load ($V_{1Lth}$) and at full-load ($V_{2Lth}$). The range of operation of the first and second voltage regulators 102 and 104 is also between $V_{2Lth}$ and $V_{LRth}$. The circuit module 106 operates at a reduced performance in this voltage range, i.e., selected operations are allowed that can be operated at low voltage and current levels. The circuit module 106 is reset at $V_{LRth}$. The values of $V_{Opt}$, $V_{1Lth}$, $V_{2Lth}$, $V_{LRth}$, and $V_{HRth}$ are selected based on the specifications and voltage requirements of the circuit module 106, and the response time of the first and second voltage regulators 102 and 104.

Figure 4:
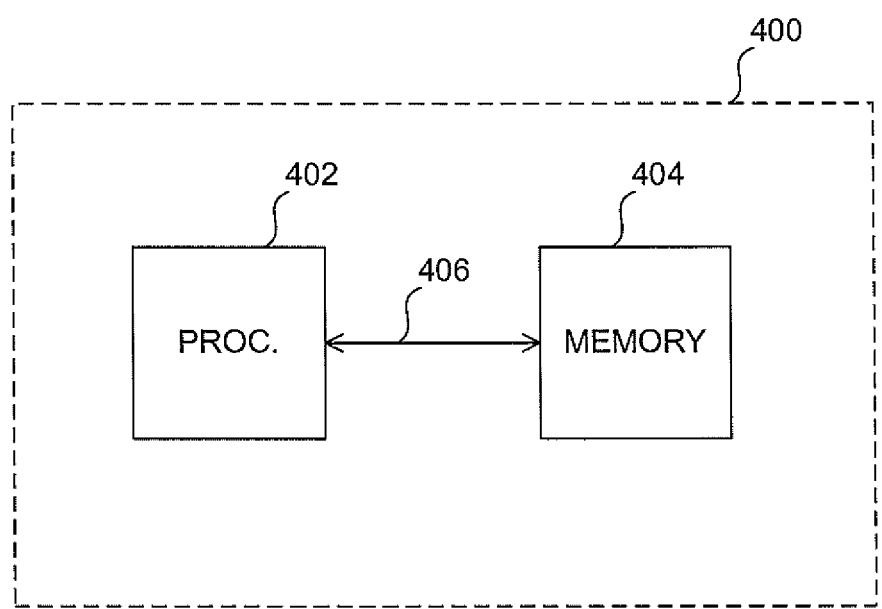
FIG. 4 is a schematic block diagram of an exemplary external design verification apparatus in accordance with an embodiment of the present invention.

FIG. 4 shows an electronic design verification apparatus 400 in accordance with an embodiment of the present invention. The verification apparatus 400 includes at least one processor 402 and at least one memory 404 in communication with the processor 402, such as with a bus 406. The memory 404 is used to store an electronic circuit design, such as the design 100 shown in FIG. 1. The memory 404 also is used to store a predefined current load model of the electronic circuit design 100. The electronic design verification apparatus 400 verifies power management in the circuit design 100 in accordance with the methods shown in FIG. 2 and previously discussed. Since such external design verification apparatus are well known in the art and have been commercially available for many years, further description is not required for a complete understanding of the invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for verifying power management in an electronic circuit design using an external design verification apparatus, wherein the electronic circuit design includes a first voltage regulator for regulating a supply voltage, a second voltage regulator for regulating the supply voltage when the supply voltage drops below a first predetermined low threshold, and a plurality of modules that are clocked using a clock having a clock frequency, and wherein the electronic circuit design is operable in at least a low power mode and a high power mode, the method comprising:

generating, using the design verification apparatus, an estimated a current load requirement of the plurality of clocked modules based on the clock frequency and a predefined current load model, wherein the predefined current load model ensures that a reset is caused only due to a failure in response time of both the first and second voltage regulators during a transition of the electronic circuit from low power mode to high power mode or high power mode to low power mode;

testing, using the design verification apparatus, the electronic circuit design with the external design verification apparatus using the estimated current load requirement by executing predetermined test patterns and during said testing, monitoring the supply voltage of the electronic circuit design, wherein the supply voltage is regulated with the first voltage regulator;

verifying, using the design verification apparatus, that the supply voltage regulation performed by the first voltage regulator, which is based on the estimated current load requirement, does not deviate from a predetermined operating voltage of the electronic circuit design; and changing the electronic circuit design if the verifying step determines that the supply voltage regulation deviates from the predetermined operating voltage.

2. The method of claim 1, further comprising determining a value of decoupling capacitors used with the first and second voltage regulators and updating the electronic circuit design to include said decoupling capacitors of said value.

3. The method of claim 1, verifying that the second voltage regulator is disabled when the supply voltage increases above the first predetermined low threshold.

4. The method of claim 1, further comprising verifying that a low voltage warning interrupt is generated for reducing the clock frequency when the voltage supplied to the electronic circuit design drops below a second predetermined low threshold.

5. The method of claim 1, further comprising verifying that an interrupt to reset the electronic circuit is generated when the voltage supplied to the electronic circuit design drops below a predetermined low reset threshold voltage.

6. The method of claim 1, further comprising verifying that an interrupt to reset the electronic circuit is generated when the voltage supplied to the electronic circuit design overshoots a predetermined high reset threshold voltage.

7. The method of claim 1, wherein the plurality of modules comprises at least one of processor cores, memory modules, hard macros and peripheral sets.

8. The method of claim 7, wherein the predefined current load model calibrates the current load requirement of the plurality of modules in proportion to the clock frequency, the plurality of peripheral sets and hard macros, and a gate count of the electronic circuit design.

9. The method of claim 8, wherein the predefined current load model calibrates the current load requirement of the plurality of modules based on the gate count and a predefined milli-ampere per megahertz (mA/Mhz) rating of each module, and a current requirement of the hard macros.

10. An electronic design verification apparatus including at least one processor and at least one memory in communication with the processor, wherein the memory is used to store an electronic circuit design and a predefined current load model of the electronic circuit design, the electronic design verification apparatus for verifying power management in the circuit design, wherein the circuit design includes a first voltage regulator for regulating a supply voltage, a second voltage regulator for regulating the supply voltage when the supply voltage drops below a first predetermined low threshold, and a plurality of modules that are clocked by a clock having a clock frequency, and wherein the electronic circuit design is operable in at least a low power mode and a high power mode, the electronic design verification apparatus comprising:

means for estimating a current load requirement of the plurality of clocked modules based on the clock frequency and a predefined current load model, wherein the predefined current load model ensures that a reset is caused only due to a failure in response time of both the first and second voltage regulators during a transition of the electronic circuit from low power mode to high power mode or high power mode to low power mode;

means for monitoring the supply voltage supplied to the electronic circuit design; and means for regulating the supply voltage supplied to the electronic circuit design using the first voltage regulator based on the estimated current load requirement when the supplied voltage deviates from a predetermined operating voltage.

11. The electronic design verification apparatus of claim 10, further including the step of determining a value of decoupling capacitors used with the first and second voltage regulators and updating the electronic circuit design to include said decoupling capacitors of said value.

12. The electronic design verification apparatus of claim 10, further including the step of verifying that the second voltage regulator is disabled when the supplied voltage increases above the first predetermined low threshold.

13. The electronic design verification apparatus of claim 10, further including the step of verifying that a low voltage warning interrupt is generated for reducing the clock frequency when the voltage supplied to the circuit design drops below a second predetermined low threshold.

14. The electronic design verification apparatus of claim 10, further including the step of verifying that an interrupt to reset the electronic circuit design is generated when the voltage supplied to the circuit design drops below a predetermined low reset threshold.

15. The electronic design verification apparatus of claim 10, further including the step of verifying that an interrupt to reset the circuit design is generated when the voltage supplied to the circuit design overshoots a predetermined high reset threshold.

16. The electronic design verification apparatus of claim 10, wherein the plurality of modules comprises at least one of processor cores, memory modules, hard macros and peripheral sets.

17. The electronic design verification apparatus of claim 16, wherein the predefined current load model calibrates the current load requirement of the plurality of modules in proportion to the clock frequency, the plurality of peripheral sets and hard macros, and a gate count of the circuit design.

18. The electronic design verification apparatus of claim 16, wherein the predefined current load model calibrates the current load requirement of the plurality of modules based on a predefined milli-ampere per megahertz (mA/Mhz) rating of each module and a current requirement of the plurality of hard macros.

* * * * *

UNITED STATES PATENT AND TRADEMARK OFFICE
CERTIFICATE OF CORRECTION

| | |
|---|---|
| PATENT NO. | : 8,645,886 B2 |
| APPLICATION NO. | : 13/447305 |
| DATED | : February 4, 2014 |
| INVENTOR(S) | : Abhishek et al. |

It is certified that error appears in the above-identified patent and that said Letters Patent is hereby corrected as shown below:

In the Claims

Column 7, Line 53, Claim 1, please delete "regulating the supply voltage when the supply" and insert --regulating a supply voltage, a second voltage regulator for regulating the supply voltage when the supply--

Signed and Sealed this
Sixteenth Day of September, 2014

Michelle K. Lee
*Deputy Director of the United States Patent and Trademark Office*